United States Patent [19]
Dacus

[11] Patent Number: 5,970,105
[45] Date of Patent: Oct. 19, 1999

[54] APPARATUS AND METHOD FOR EFFICIENT WIRELESS COMMUNICATIONS IN THE PRESENCE OF FREQUENCY ERROR

[75] Inventor: Farron L. Dacus, Irving, Tex.

[73] Assignee: Cleveland Medical Devices Inc., Cleveland, Ohio

[21] Appl. No.: 09/075,610

[22] Filed: May 11, 1998

[51] Int. Cl.$^6$ .................................................. H04L 27/06
[52] U.S. Cl. ...................................... 375/344; 455/192.2
[58] Field of Search .................................... 375/316, 260, 375/200, 376, 344; 455/182.1, 182.2, 182.3, 192.1–192.3, 76, 306

[56] References Cited

U.S. PATENT DOCUMENTS

| | | | |
|---|---|---|---|
| 3,893,118 | 7/1975 | Overbury | 342/402 |
| 4,876,741 | 10/1989 | Jacobs et al. | 455/234.2 |
| 5,668,837 | 9/1997 | Dent | 375/316 |
| 5,790,587 | 8/1998 | Smith et al. | 375/260 |
| 5,815,525 | 9/1998 | Smith et al. | 375/316 |
| 5,890,051 | 3/1999 | Schlang et al. | 455/76 |

*Primary Examiner*—Tesfaldet Bocure
*Attorney, Agent, or Firm*—John H. Vynalek

[57] ABSTRACT

A receiver for efficient wireless communications in the presence of frequency errors in a radio frequency received signal is disclosed. The receiver comprising a receiver channel, a wide band frequency acquisition mode, automatic frequency control, a narrow band demodulation mode and a demodulator. The receiver channel has a variable bandwidth and an approximately fixed receiver mid-channel frequency. The wide band frequency acquisition mode comprises a wide channel filter which initially defines the bandwidth to be greater than the frequency error in the received signal and wherein the frequency error is determined by comparing the received signal frequency to the receiver mid-channel frequency. The automatic frequency control comprises at least one frequency adjustable local oscillator which it adjusts based upon the frequency error such that the frequency difference between the receiver mid-channel frequency and the received signal is made negligible, thereby approximately centering the received signal within the bandwidth in the wide band frequency acquisition mode. The narrow band demodulation mode comprises a narrower channel filter which narrows the bandwidth of the receiver channel with respect to the wide band frequency acquisition mode and maintains approximately the same receiver mid-channel frequency. The demodulator demodulates the received signal in the narrow band demodulation mode. Automatic frequency control and bandwidth selection using-adaptive digital signal processing based filters is also disclosed. In this case instead of the local oscillator being adjusted to tune in the desired signal, the filter center frequency is adapted.

25 Claims, 3 Drawing Sheets

APPARATUS AND METHOD FOR EFFICIENT WIRELESS COMMUNICATIONS IN THE PRESENCE OF FREQUENCY ERROR

BACKGROUND OF THE INVENTION

1. Field of the Invention

The present invention relates, generally, to the field of wireless communications, and, more specifically, to low power local area wireless communications such as point to point data communications, automatic identification, remote control, and status reporting.

2. Description of the Related Art

The radio link performance for equipment like computer to computer data links, garage door openers, vehicle toll tags, and remote keyless entry systems is often limited by the high emphasis placed upon small size and low cost. Progress in equipment design in this field requires advances in performance where the necessary low cost and size are still maintained.

The earliest equipment of this type involved amplitude modulated transmitters based on free running oscillators, usually inductor/capacitor (LC) resonator based. Receivers were often of the low part count regenerative type, also using free running LC oscillators. These LC systems were of very low performance, and the desire to improve system operation led to general industry conversion to surface acoustic wave (SAW) based technology, beginning in the early 1980's. SAW's are a form of crystal resonator where the resonant acoustic vibration that defines crystal operating frequency is constrained to the surface region of the device material, as opposed to classic bulk mode crystals, where the acoustic vibration occurs throughout the body of the device. The surface mode of operation allows operation to much higher frequencies than bulk mode, extending currently to several GHz, but at the cost of reduced frequency accuracy as compared to bulk mode crystals. Though much more frequency accurate than LC technology, SAW's exhibit approximately one to two orders of magnitude more frequency error than bulk mode crystals. This frequency error leads SAW based receivers and transmitters to typically employ a wide band channel bandwidth that is much wider than the modulation bandwidth of the transmitted signal, which in turn worsens sensitivity, range, and immunity to interference as opposed to a narrower bandwidth that did not allow excessive noise contamination of the signal.

For example, in the 902 to 928 MHz Industrial, Scientific, and Medical (ISM) band, the frequency accuracy of a SAW based transmitter is typically+/−100 KHz with a typical data rate of 5000 bits/second and a transmitted bandwidth of approximately 10 KHz. The 200 KHz minimum receiver bandwidth to have this transmitter come up in channel is 20 times greater than the bandwidth required by the data rate. This leads to reduction in sensitivity of approximately 13 dB and a twenty times increase in vulnerability to interference compared to a minimum bandwidth receiver design. However, an advantage of having a receive channel bandwidth wide enough to cover any possible frequency error in the transmitter is that the receiver can very quickly detect the incoming signal and prepare itself for actual data reception.

At the same time that SAW's have come to dominate low power wireless, the cellular telephone and higher level wireless industry have achieved great market success, which has in turn led to a new generation of high performance yet compact radio technology. The frequency sources for this class of equipment are generally processor controlled frequency synthesizers, which have been steadily increasing in integration level, to the point where a synthesized signal source can be competitive in size to a SAW based signal source. These compact synthesizers allow transmitters and channel defining local oscillators in receivers to be set via software control to any of a large number of frequencies uniformly distributed across the band of interest. The frequency accuracy is determined by precision bulk mode crystal oscillator references, which allows channel placement error to be constrained to a small fraction of the bandwidth of typical data rates, thus eliminating the need for wider receiver bandwidth to allow for frequency error. Since electronic noise that limits receiver sensitivity is directly proportional to bandwidth, using the narrowest possible bandwidth leads to maximum sensitivity. This more advanced technology can be applied to some segments of the low power wireless market directly, but in other segments the demands for the lowest possible power, size, and expense cannot easily be met by these more sophisticated methods. A highly accurate crystal based reference can be more expensive than an entire transmitter in a low power wireless application. Therefore a synthesized transmitter in such an application would typically use a lower accuracy crystal reference that, while superior in accuracy to a SAW device, still causes frequency error that is a large fraction of the desired channel bandwidth. Maintaining optimum system performance with the reduced transmit frequency accuracy of either SAW or inexpensive crystals requires specialized receiver techniques aimed at maintaining minimum receiver bandwidth in the presence of the frequency error, and minimum time latency in dealing with such frequency error. However, specialized receiver designs optimized for this type of operation are not commercially available.

Therefore, there exists a need for an apparatus and a method which provides the higher performance available from optimum narrow band systems utilizing high accuracy crystal reference based frequency stabilization while maintaining, to the greatest extent possible, the low cost and low size advantages of the SAW based systems.

BRIEF SUMMARY OF THE INVENTION

The present invention provides an apparatus and a method to satisfy the aforementioned need.

Accordingly, one object of the present invention is to provide a receiving means having a high sensitivity that is not limited by the frequency error in the received signal, and to do so in a minimum cost and size form. This includes receiving means utilizing classic superheterodyne form as well as forms utilizing direct conversion.

Another object of the present invention is to provide a receiving means having this high sensitivity while allowing for either amplitude modulation (AM) or frequency modulation (FM), in order to allow reception from multiple transmitter types, including both SAW based and synthesized transmitters.

Still another object of the present invention is to provide receiving means that can be prepared or configured in a minimum amount of time from the time the received signal is detected.

Accordingly, the present invention relates to a receiving means for efficient wireless communications in the presence of frequency errors in a radio frequency received signal, comprising a receiver channel, a wide band frequency acquisition mode, automatic frequency control means, a narrow band demodulation mode, and a demodulator. The receiver channel has a variable bandwidth and an approximately fixed receiver mid-channel frequency. The wide band frequency acquisition mode comprises a wide channel filter which initially defines the bandwidth to be greater than the frequency error in the received signal and wherein the frequency error is determined by comparing the received signal frequency to the receiver mid-channel frequency. The automatic frequency control loop comprises at least one frequency adjustable local oscillator which selects the receiver mid-channel frequency and adjusts it based upon the frequency error so determined such that the frequency difference between the receiver mid-channel frequency and the received signal is made negligible, thereby approximately centering the received signal within the bandwidth in the wide band frequency acquisition mode. The narrow band demodulation mode comprises a narrower channel filter which narrows the bandwidth of the receiver channel with respect to the wide band frequency acquisition mode and maintains approximately the same receiver mid-channel frequency. The demodulator demodulates the received signal in the narrow band demodulation mode.

In another aspect, the present invention relates to a method for achieving efficient wireless communications in the presence of frequency error in a radio frequency received signal, comprising the steps of providing a receiving means which receives the received signal and which has at least one frequency adjustable local oscillator; selecting a receiver channel for the receiving means with a wide band frequency acquisition mode bandwidth greater than any frequency error in the received signal and having a receiver mid-channel frequency; applying automatic frequency control which responds to the frequency error and controls the at least one frequency adjustable local oscillator which selects the receiver mid-channel frequency; and which adjusts the frequency of at least one frequency adjustable local oscillator such that the frequency difference between the receiver mid-channel frequency and the received signal is made negligible, thereby approximately centering the received signal within the wide band frequency acquisition mode bandwidth; and switching from the wide band frequency acquisition mode bandwidth to a narrow band demodulation mode bandwidth while maintaining approximately fixed receiver mid-channel frequency; and demodulating the received signal.

In another aspect, the present invention relates to a method for achieving efficient wireless communications in the presence of frequency errors in a radio frequency received signal, comprising the steps of providing a receiving means which receives the received signal and which has at least one frequency adjustable local oscillator; selecting a receiver channel for said receiving means with a bandwidth greater than any frequency error in the received signal and having a receiver mid-channel frequency; adjusting automatically the frequency of at least one frequency adjustable local oscillator based upon the frequency error such that the frequency difference between the receiver mid-channel frequency and the received signal is made negligible, thereby centering the received signal within the bandwidth; narrowing the bandwidth; and demodulating the received signal.

In yet another aspect, the present invention relates to a method for achieving efficient wireless communications in the presence of frequency error in a radio frequency received signal, comprising the steps of providing a receiving means which receives the received signal and which has at least one frequency adjustable digital filter with variable center frequency and bandwidth; selecting a receiver channel for the receiving means with a wide band frequency acquisition mode bandwidth greater than any frequency error in the received signal and having a receiver mid-channel frequency; applying automatic frequency control which responds to the frequency error and controls the at least one frequency adjustable digital signal processing filter which selects the receiver mid-channel frequency; and which further adjusts the center frequency of at least one frequency adjustable digital signal processing filter such that the frequency difference between the receiver mid-channel frequency and the received signal is made negligible, thereby approximately centering the received signal within the wide band frequency acquisition mode bandwidth; and switching the at least one digital signal processing filter from the wide band frequency acquisition mode bandwidth to a narrow band demodulation mode bandwidth while maintaining approximately fixed receiver mid-channel frequency; and demodulating the received signal.

BRIEF DESCRIPTION OF THE SEVERAL VIEWS OF THE DRAWINGS

Further features of the present invention will become apparent to those skilled in the art to which the present invention relates from reading the following specification with reference to the accompanying drawings in which.

DETAILED DESCRIPTION OF THE INVENTION

Figure 1:
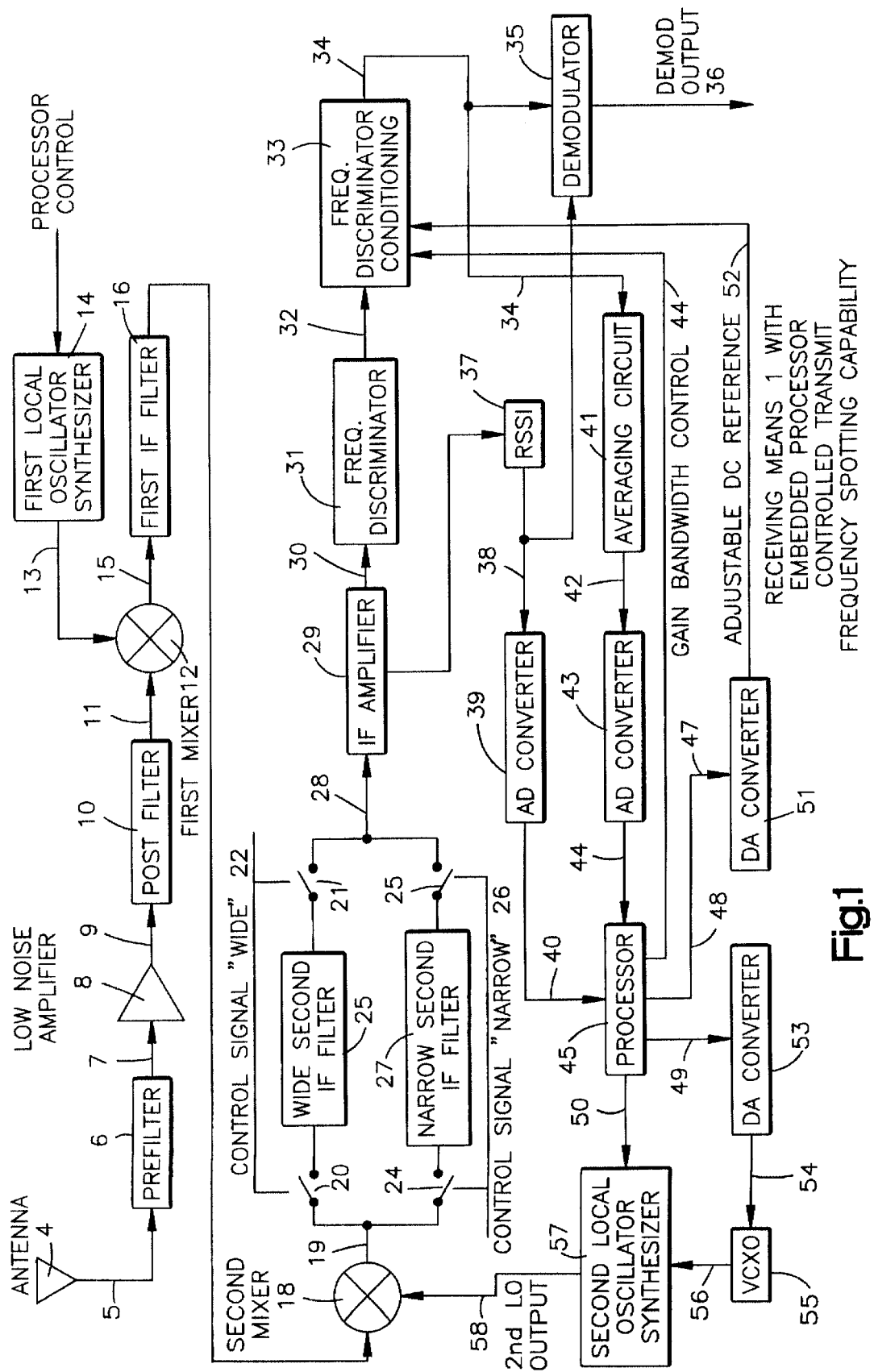
FIG. 1 is a receiver block diagram of the present invention.

Referring now to the drawings and, more particularly, to FIG. 1, there is shown a block diagram of the present invention. Although receiving means 1 is a practical design in current technology based on a double conversion superheterodyne receiver utilizing phase locked loop frequency synthesized local oscillators, one of ordinary skill in the art will understand that other receivers utilizing a different number of down conversion stages can also be used, including single conversion where a single local oscillator converts immediately to a final intermediate frequency (IF) where demodulation takes place. Direct conversion or "zero IF" can also be used, which is a special case of single conversion where the single local oscillator is at the receiver channel frequency and converts received signal carrier directly to DC. In the direct conversion case, high gain and channel bandwidth filtering are provided at baseband.

In this embodiment, at least one frequency adjustable local oscillator is included, which can be in other forms besides frequency synthesis, including SAW based. Means for defining at least two bandwidths for the receiver channel is included. The bandwidth is initially defined to be greater than the frequency error in the received signal in the wide band frequency acquisition mode, and is then narrowed to be approximately equal to the received signal bandwidth in the narrow band demodulation mode. In the superheterodyne case the means for defining the bandwidth is shown as wide IF filter 23 and narrow IF filter 27, while in the direct conversion case the two bandwidths are defined by baseband filters. Both IF and baseband filters may also be implemented by use of digital signal processing techniques. Those skilled in the art will understand that more stages of IF filtering and amplification than shown in FIG. 1 are often used in practice. Also, any modulation format can be used, but typically either amplitude or frequency modulation is most appropriate. Most SAW based transmitters use amplitude modulation, and inexpensive synthesized transmitters would typically take advantage of the higher performance of frequency demodulation.

The frequency error is determined by comparing the received signal frequency to the mid-channel frequency. Such determination of frequency error includes measurement by capturing a voltage proportional to frequency variation, direct counting of frequency, use of an analog quantity in an analog frequency control system that is proportional to frequency error, or any other method that causes a response proportional to frequency error. The frequency of the local oscillator is adjusted based upon the frequency error so determined such that the difference between the mid-channel frequency and the received signal is made negligible. This provides for approximately centering the received signal within the bandwidth. The means for adjusting the frequency of the frequency adjustable local oscillator may be any means or system for adjusting the frequency, but is typically automatic frequency control means. In the preferred embodiment it is a processor 45 based automatic frequency control means.

When in narrow band demodulation mode the noise level is lower since noise is proportional to bandwidth. Since the signal power stays the same, the signal to noise ratio as compared to wide band frequency acquisition mode is improved, thus range and reliability are improved. However, the reduced signal to noise ratio in wide band frequency acquisition mode is acceptable when the purpose of being in that mode is frequency acquisition as opposed to demodulation, because signal frequency acquisition does not require as high a signal to noise ratio as reliable demodulation. Thus the system can achieve the important design objective of frequency acquisition under weak signal conditions where reliable demodulation is not possible, but then switch to narrow band demodulation mode where reliable demodulation is significantly enhanced, thus improving on previous system designs where the receiver performs the demodulation in a single wide band mode. In the case of frequency modulation an FM demodulator such as a frequency discriminator that performs the narrow band demodulation can be re-used as part of the automatic frequency control means in the wide band frequency acquisition mode. Using the same FM demodulator used in the normal demodulation is of course the most efficient possible method and has the additional advantage of having the AFC means set the incoming frequency to the most advantageous point for the most linear demodulation. For the FM demodulator to be used as part of the AFC means it must be DC coupled, which is not the typical case in FM demodulator design. Because there are often strict DC level requirements on the output of the demodulator, DC trim methods may be applied instead of the more normal AC coupling in order to assure exact DC level requirements are met. Automatic frequency control means can be used to further fine tune the centering of the received signal in the narrow band demodulation mode, which enables maintaining the narrowest possible narrow band bandwidth. Frequency demodulator or discriminator conditioning means may provide for switching demodulator gain (voltage out as a function of frequency in) and baseband filter bandwidth in order to optimize for performance in the different circumstances of wide band frequency acquisition mode and narrow band demodulation mode.

Still referring to FIG. 1, the receiving antenna 4 receives a received RF signal and produces an antenna output 5 that drives the input of bandpass prefilter 6, which suppresses out of band emissions. The prefilter output 7 drives the input of low noise amplifier 8, whose amplifier output 9 drives another bandpass filter, referred to as the post LNA filter 10. The post LNA filter output 11 drives first mixer 12, which is also driven by the first LO output 13 of first local oscillator synthesizer 14. The received signal carrier and its modulation on post LNA filter output 11 is transformed to two new frequencies that are given by the sum and the absolute value of the differences in the frequencies of post LNA output 11 and first LO output 13, and are provided on the first mixer output of 15. One of these two frequencies is the desired first IF frequency given by the center of bandpass intermediate frequency filter 16, which provides a cleanly filtered first IF output 17 that drives second mixer 18. Second mixer 18 is also driven by second LO output 58, and provides a second mixer output 19 at the two frequencies given by the sum and the absolute value of the differences between the first IF output 17 and the second LO output 58. One of these two frequencies is the desired second IF frequency.

Figure 2:
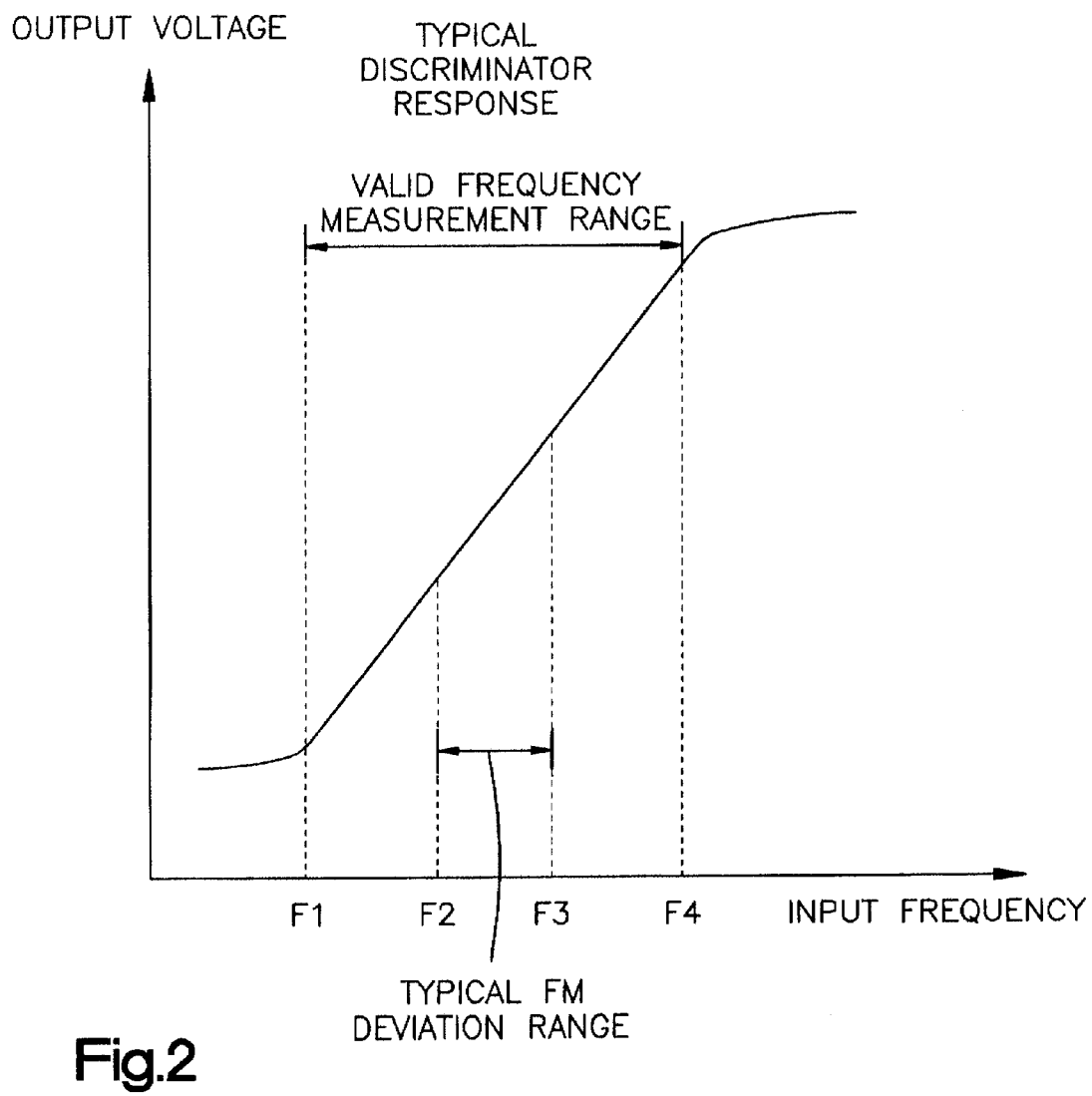
FIG. 2 is a graph of the typical response of a frequency discriminator of the present invention.

Wide filter input switch 20, wide filter output switch 21, narrow filter input switch 24 and narrow filter output switch 25 are radio frequency electronic switches. Wide filter input switch 20 and wide filter output switch 21 are controlled by the processor 45 through control signal Wide 22 and are set to be closed and conducting only when control signal Wide 22 is set to a high state. Narrow filter input switch 24 and narrow filter output switch 25 are controlled by the processor 45 through control signal Narrow 26, and are set to closed and conducting only when control signal Narrow 26 is set to a high state. Second mixer output 19 inputs to wide filter input switch 20 and narrow filter input switch 24, only one of which is closed at a time. If control signal Wide 22 is high and control signal Narrow 26 is low, wide filter input switch 20 and wide filter output switch 21 are closed and second mixer output 19 may flow through wide second IF filter 23. In this mode narrow filter input switch 24 and narrow filter output switch 25 are open and narrow IF filter 27 is effectively removed from the circuit. The receiving means 1 is then in a wide band frequency acquisition mode whose bandwidth is defined by wide IF filter 23. If control signals Narrow 26 were high and Wide 22 were low, then signal 19 would be applied only to narrow second IF filter 27, and the receiver would be in the narrow band demodulation mode with bandwidth determined by narrow second IF filter 27. The selected wide or narrow output 28 is provided as input to IF amplifier 29 whose output 30 is inputted to frequency discriminator 31, which provides frequency discriminator output 32 whose voltage is a function of instantaneous frequency as shown in FIG. 2. Frequency discriminator output 32 is a "baseband" signal, defined as one that carries the desired information directly without benefit of being attached to a modulated radio frequency carrier. Frequency discriminator baseband output 32 drives frequency discriminator conditioning means 33 whose purpose is to amplify and filter frequency discriminator output 32 as needed to meet circuit operational requirements. The DC level in the frequency discriminator conditioning means output 34 is controlled by adjustable DC reference output 52 of first digital to analog converter 51 that is controlled by processor 45. The gain and baseband frequency response of frequency discriminator conditioning means 33 is dependent upon gain/bandwidth control signal 46 also provided by processor 45. The variable gain is desirable for the frequency discriminator 31 to provide for frequency error information in the wide band frequency acquisition mode in addition to its more typical function of frequency demodulation. To allow measurement of large possible frequency error conditioning means 33 must have a frequency measurement range that typically greatly exceeds the frequency deviation of the received signal carrier in the case of frequency modulation. If the voltage gain of conditioning means 33 were constant while allowing for an optimum signal range for frequency error measurement, the resulting small voltage variation provided for demodulation with this same gain might not meet minimum circuit voltage swing requirements. Providing mode dependent voltage gain overcomes this difficulty by allowing optimum signal levels for both frequency error measurement and demodulation. Similarly, frequency discriminator conditioning means 33 may also provide low pass filtering that may be of variable bandwidth also controlled by gain/bandwidth control signal 46. There are several reasons to allow variable bandwidth of filtering in conditioning means 33. One is that a higher bandwidth of baseband filtering is typically (but not always) required in the narrow band demodulation mode to allow for high data rates than is needed in the wide band frequency acquisition mode where no data is transmitted. Allowing mode dependent filter bandwidths results in performance that is optimized for the different requirements of the frequency acquisition and frequency demodulation functions. Another is that dual baseband bandwidth may be desired so that AFC means bandwidth may itself be adapted to suit various operational requirements, such as the desire to acquire faster at initial acquisition, but to also allow slower and more noise immune AFC means operation for tracking of slow transmit frequency drift following initial acquisition. If extremely fast frequency acquisition is a design requirement, then the AFC bandwidth may be set higher in wide band frequency acquisition mode than it is in narrow band demodulation mode, and that AFC bandwidth switch may be accomplished with the frequency discriminator conditioning means. Frequency discriminator conditioning means output 34 is inputted to averaging circuit 41, which also provides any further necessary low pass filtering for sufficient suppression of noise or modulation on frequency discriminator conditioning means output 34. This extra filtering is required in the case of the receiving means 1 being in the narrow band demodulation mode while automatic frequency control is allowed to remain operational, for example, to track any slow drift in the transmitted signal. Averaging circuit 41 may also contain positive and negative peak detectors to improve accuracy in determining the median voltage on frequency discriminator conditioning means output 34 in the presence of frequency shifted keyed data modulation that is not 50% ones and zeroes, thus preventing any automatic frequency control error as a result of DC content of the received signal. Averaging circuit 41 provides filtered median output 42 as input to first analog to digital converter 43, which in turn provides first AD output 44 to processor 45. The processor 45 may be either a microprocessor or a microcontroller. Firmware in processor 45 may provide processor controlled automatic frequency control interpreting digital data provided by first AD output 44 as a frequency representative of the carrier frequency of the transmitter, and then taking appropriate action to tune the first local oscillator synthesizer 14, second local oscillator synthesizer 57, and the voltage controlled crystal oscillator (VCXO) 55 in order to center the received signal in the receiver channel frequency. One of ordinary skill in the art recognizes that not all three of these frequency adjustable local oscillator synthesizers may need to be tuned, and many implementations may require only one or two of VCXO 55, second local oscillator synthesizer 57, and first local oscillator synthesizer 14 to have tune capability. The most flexible implementation allows for all three to be tuned, with first local oscillator synthesizer 14 providing a coarse and wide stepping tune function, for example 100 KHz, second local oscillator synthesizer 57 providing a medium granularity step, for example 10 KHz, and VCXO 55 as controlled by second digital to analog converter 53, a fine tune whose granularity, even when multiplied up by the synthesizers, can approach being negligible. A simple implementation for use with SAW based transmitters may be based on a SAW controlled local oscillator that is tuned via a second digital to analog converter 53 voltage, thus avoiding the necessity of frequency synthesis.

Once the received signal has been tuned in as nearly as possible in the wide band frequency acquisition mode, processor 45 can switch to the narrow band demodulation mode by taking control signal Wide 22 low and opening wide filter input switch 20 and wide filter output switch 21, and taking control signal Narrow 26 high, closing narrow filter input switch 24 and narrow filter output switch 25, thus removing wide second IF filter 23 from the circuit and putting in narrow second IF filter 27. The frequency discriminator conditioning circuit 33 will normally be switched to a higher gain at this point to provide optimum signal swing for demodulation. A fine tune can optionally be performed to perfectly center the received signal at this time in the narrow band demodulation mode, normally involving second local oscillator synthesizer 57 and VCXO 55. This fine tune can be performed by the automatic frequency control system, or, if the difference between the exact center frequencies of the wide and narrow IF filters is known, then a compensating frequency step may simply be commanded by the processor 45 upon switching to the narrow band demodulation mode. Either type of fine tune operation can be followed by a possible adjustment to adjustable DC reference 52 in order to precisely set the DC content of frequency discriminator conditioning means output 34 to a level appropriate for demodulator 35. This DC adjustment may be required because the receiver is DC coupled from frequency discriminator 31 back through the rest of the automatic frequency control and demodulation circuitry in order to provide DC frequency error and modulation information. DC coupling also has the advantage of avoiding delays associated with charging AC coupling capacitors, thus minimizing the time required to acquire and tune the received signal and begin demodulation of actual data.

Received signal strength indicator (RSSI) capability is often included in modem receiver integrated circuits because cellular and other modem wireless applications require awareness of signal strength. It will be noted in FIG. 1 that received signal strength indicator (RSSI) means 37 also provides its RSSI output 38 to the demodulator 35. This is to allow for amplitude demodulation capability for use with very simple transmitters, such as typical SAW based designs.

In the direct conversion case, circuitry can be saved over that shown in FIG. 1 by avoiding switching in of totally new IF filters (switching between wide IF filter 23 and narrow IF filter 27). The "IF" in the direct conversion case is zero, and the required bandwidth of the baseband filters in the wide band frequency acquisition mode is primarily determined by the desired frequency acquisition time and the possible frequency error of input signal. In the narrow band demodulation mode the required bandwidth is that needed to pass the modulation used. The structure of such baseband filters, commonly utilizing operational amplifiers based active filters, permits the switching of bandwidth by switching resistors and/or capacitors in the active filter circuit, or by switching (changing) capacitors and/or clock rates in the case of "switched capacitor" filters that use charge rapidly pumped on and off the switched capacitors to emulate resistors. Such reuse of circuitry allows for high efficiency, and consequently small size and low power consumption. A further very attractive point to using direct conversion in the present invention is that it is more highly integratable than the more classic superheterodyne with an IF above the modulation bandwidth frequency. Integration of IF filters is not feasible with present integrated circuit technology, whereas integration of entire direct conversion receiving means with an active filtering has been accomplished.

Referring now to FIG. 2 there is shown a typical response curve for a frequency discriminator such as could be used in frequency discriminator 31 of FIG. 1. The curve plots Input Frequency against Output Voltage and shows the Typical FM Deviation Range F2–F3 and the Valid Frequency Measurement Range F1–F4. Though these curves are inherently nonlinear, they usually have an approximately linear range where voltage output variation from nominal is indicative of frequency error to a fair degree of accuracy. The goal of the receiving means 1 in FIG. 1 is to center the voltage on the frequency discriminator output 32 regardless of frequency error in the received signal by adjusting the first local oscillator synthesizer 14 and second local oscillator synthesizer 57 frequencies to compensate for that error. This results in correct centering despite any nonlinearity in the curve of FIG. 2 due to its iterative processor 45 controlled nature that homes in on the best possible synthesizer frequency outputs.

Referring now to both FIG. 1 and FIG. 2, if the frequency error in the received signal is so severe that it is beyond the Valid Frequency Measurement Range (F1–F4), then the processor 45 can determine this fact through reading the RSSI voltage on RSSI output 38 as read by second analog to digital converter 39 and provided to processor 45 by second AD output 40. This is because the bandwidth of frequency discriminator 31 will, by design, be at least approximately equal to and normally greater than the bandwidth of wide IF filter 23, so that wide IF filter 23 attenuates the received signal if the frequency error is so great as to place the received signal where it approaches the limits of the valid measurement range of frequency discriminator 31. Thus for systems that allow for such high frequency error, such as SAW based transmitters, the receiving means 1 can perform a brief scan over the frequency range in which the transmitter is constrained to lie, building a table of RSSI output 38 and frequency discriminator conditioning means output 34 values, and can then determine valid values of frequency discriminator conditioning means output 34 by comparison with RSSI outputs 38. The RSSI outputs 38 normally approximately peak for valid frequency centering in the frequency discriminator 31. Once the frequency adjustments have captured the received signal within the bandwidth of wide IF filter 23, more accurate frequency adjustments are then made based upon frequency discriminator output 32.

Figure 3:
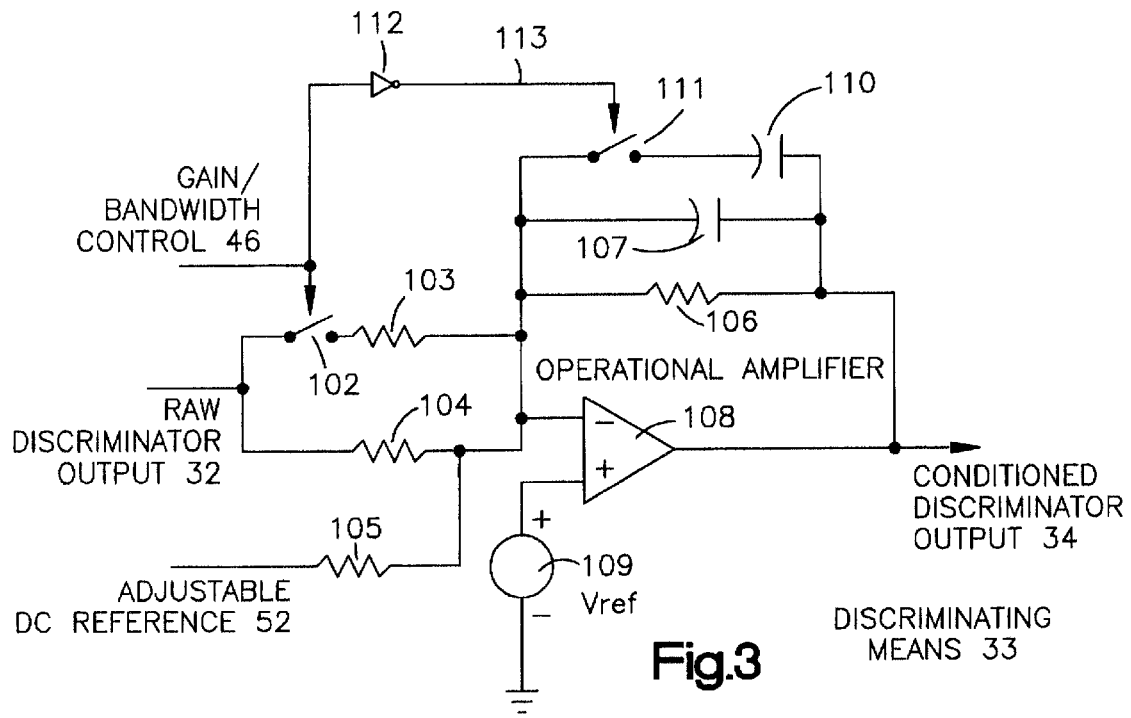
FIG. 3 is a schematic of the discriminator conditioning means of the present invention.

Referring now to FIG. 3, a preferred embodiment is shown of the frequency discriminator conditioning means 33 of FIG. 1. The circuit is based on operational amplifier 108, which is configured as an inverting amplifier and low pass filter with respect to frequency discriminator output 32 and with adjustable DC reference 52 to place control of the DC content in frequency discriminator conditioning means output 34 under processor 45 (not shown) control. Low pass filter capacitor 107 and low pass filter resistor 106 form an impedance that allows for a single pole of low pass filtering. Gain/bandwidth control signal 46 is used to close and open gain control analog switch 102 such that first gain control resistor 103 is in parallel with second gain control resistor 104, or not, thus placing the gain of the circuit under processor 45 control. Also shown is inverted control analog switch 111 and low pass bandwidth capacitor 110 that allow processor 45 control of low pass bandwidth also. Typically, in the wide band frequency acquisition mode, gain control signal 46 would be low and gain control analog switch 102 would be open, so that the gain from frequency discriminator output 32 to frequency discriminator conditioning means output 34 is reduced. The lower gain in this mode is called for since the frequency error is potentially large and a wide range of voltages can occur on frequency discriminator output 32. While in wide band frequency acquisition mode, with gain control signal 46 in a low state, inverter 112 will have inverter output 113 in a high state, closing inverter analog switch 111 and providing for a lower low pass cut off frequency. This is because even relatively swift operation in wide band frequency acquisition mode usually allows for less bandwidth than in narrow band demodulation mode, and using the lowest bandwidth necessary reduces noise and improves reliability. Once in narrow band demodulation mode the received signal has been more closely tuned in, making it desirable to increase the gain of the block so that the usually relatively small frequency modulated frequency deviation that appears as voltage variation on frequency discriminator conditioning means output 34 is of sufficient amplitude to drive the demodulator 35 of FIG. 1. In the circuit shown, in narrow band demodulation mode, gain/bandwidth control signal 46 would be high and inverter analog switch 111 would open, resulting in a higher low pass bandwidth that allowed the desired modulation to pass. It is seen that in the operating scenario presented gain control signal 46 can sometimes be replaced with control signal Narrow 26, provided that any fine tuning adjustments in narrow band demodulation mode can be accomplished in the potentially wider low pass bandwidth of FIG. 3 as shown. Adjustable DC reference 52, controlled by processor 45 of FIG. 1, provides a means to adjust the DC level in frequency discriminator conditioning means output 34 to a desired level. Those of normal skill in the art will recognize that there are numerous ways of altering this circuit design and still achieving the desired goals of processor 45 controlled gain, filter bandwidth, and DC output level.

Figure 4:
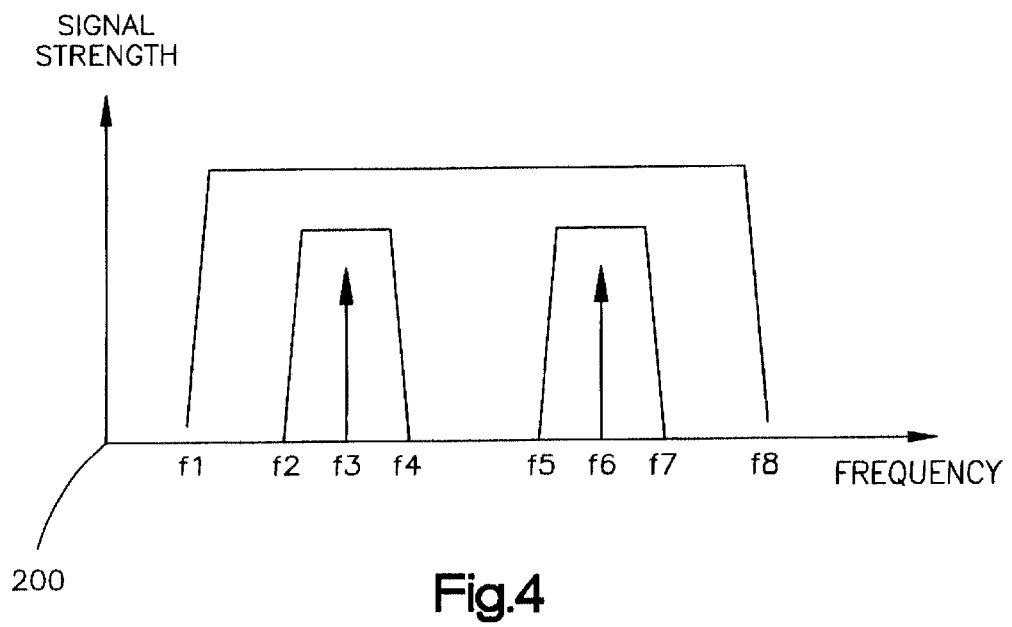
FIG. 4 is a graph of the wide band frequency acquisition bandwidth and two different frequency received signals within this bandwidth, with each of the two different frequency signals shown surrounded by narrow band demodulation mode bandwidths that would be implemented in the case of system implementation via adjustable digital signal processing filters.

Referring now to FIG. 4, a Signal Strength v Frequency graph 200 is shown of the wide band frequency acquisition mode bandwidth f1–f8 and two possible different frequency received signals f3, f4 within this bandwidth, with each of the two different frequency signals shown surrounded by narrow band demodulation mode bandwidths, f2–f4 and f5–f7, respectively, that are implemented via adjustable (adaptive) digital signal processing based filters (not shown). In this embodiment the automatic frequency control means is implemented mathematically by changing the center frequency of the digital signal processing based intermediate frequency filters, instead of the more common method of changing the local oscillator frequency to translate the frequency of the received signals f3, f6 to a fixed intermediate frequency. The switch from wide band frequency acquisition mode to narrow band demodulation mode is also carried out by adapting the digital filter, in this case by narrowing the bandwidth appropriately around the new center frequency determined by the wide band frequency acquisition mode. This method of automatic frequency control primarily applies to the case of superheterodyne receivers where the digital signal processing is implemented at an intermediate frequency. The direct conversion receiver must typically utilize local oscillator based automatic frequency control due to the practical necessity to transform the carrier frequency directly to zero, thereby avoiding asymmetric aliasing of sidebands on the low frequency side of the carrier into the baseband bandwidth at which most processing occurs. The direct conversion receiver does allow for the switch from wide band frequency acquisition mode to narrow band demodulation mode to be accomplished with adaptive digital signal processing.

A particular embodiment of the invention has been described, but those skilled in the art will recognize that many modifications are possible that will achieve the same goals by substantially the same methods, and where those methods still fall within the true spirit and scope of the invention disclosed. Therefore the invention should be considered to be limited in scope only in accordance with the following claims.

What is claimed is:

1. A receiving means for efficient wireless communications in the presence of frequency error in a radio frequency received signal, comprising:
   a) a receiver channel having a variable bandwidth and an approximately fixed receiver mid-channel frequency;
   b) a wide band frequency acquisition mode comprising a wide channel filter which initially defines said bandwidth to be greater than said frequency error in said received signal and wherein said frequency error is determined by comparing said received signal frequency to said receiver mid-channel frequency;
   c) automatic frequency control means comprising at least one frequency adjustable local oscillator and which adjusts it, based upon said frequency error so determined, such that the frequency difference between said receiver mid-channel frequency and said received signal is made negligible, thereby approximately centering said received signal within said bandwidth in said wide band frequency acquisition mode;
   d) a narrow band demodulation mode comprising a narrower channel filter which narrows said bandwidth of said receiver channel with respect to said wide band frequency acquisition mode and maintains approximately the same said receiver mid-channel frequency; and
   e) a demodulator which demodulates said received signal in said narrow band demodulation mode.

2. The receiving means of claim 1 wherein said automatic frequency control means centers said received signal within said bandwidth in said narrow band demodulation mode.

3. The receiving means of claim 1 wherein said at least one local oscillator is based upon phase locked loop frequency synthesis.

4. The receiving means of claim 3 further comprising a voltage controlled crystal stabilized oscillator as the reference to said phase locked loop based local oscillator.

5. The receiving means of claim 1 wherein said at least one local oscillator is a voltage controlled surface acoustic wave device stabilized oscillator.

6. The receiving means of claim 1 further comprising a frequency discriminator having a frequency discriminator output such that said frequency discriminator is used to determine said frequency error existing at any given time between said received signal and said receiver mid-channel frequency.

7. The receiving means of claim 1 further comprising at least one digital signal processing based filter whereby said filter is used to define said bandwidth.

8. The receiving means of claim 1 wherein said receiving means is a direct conversion receiver such that said bandwidth while in said wide band frequency acquisition mode and said narrow band demodulation mode is at baseband frequencies.

9. The receiving means of claim 1 further comprising a processor wherein said receiving means is controlled thereby.

10. The receiving means of claim 9 wherein said processor is included in said automatic frequency control means.

11. The receiving means of claim 1 wherein said receiving means is a superheterodyne receiver and further comprising a wide intermediate frequency (IF) filter and a narrow intermediate frequency (IF) filter such that said wide IF filter defines said bandwidth in said wide band frequency acquisition mode and said narrow IF filter defines said bandwidth in said narrow band demodulation mode.

12. The receiving means of claim 6 further comprising a frequency discriminator conditioning means.

13. The receiving means of claim 12 wherein said frequency discriminator conditioning means conditions said frequency discriminator output to provide different gains for said wide band frequency acquisition mode and said narrow band demodulation mode.

14. The receiving means of claim 12 wherein said frequency discriminator conditioning means provides different low pass filter cut off points as a function of said receiving means being in either said wide band frequency acquisition mode or said narrow band demodulation mode.

15. A method for achieving efficient wireless communications in the presence of frequency errors in a radio frequency received signal, comprising the steps of:
   a) providing a receiving means which receives said received signal and which has at least one frequency adjustable local oscillator;
   b) selecting a receiver channel for said receiving means with a wide band frequency acquisition mode bandwidth greater than any frequency error in said received signal and having a receiver mid-channel frequency;
   c) determining said frequency error between said received signal and said receiver mid-channel frequency;
   d) applying automatic frequency control which responds to said frequency error and which adjusts the frequency of said at least one frequency adjustable local oscillator such that the frequency difference between said receiver mid-channel frequency and said received signal is made negligible, thereby approximately centering said received signal within said wide band frequency acquisition mode bandwidth; and
   e) switching from said wide band frequency acquisition mode bandwidth to a narrow band demodulation mode bandwidth while maintaining approximately fixed receiver mid-channel frequency; and
   f) demodulating said received signal.

16. The method of claim 15 wherein said at least one local oscillator is based upon phase locked loop frequency synthesis.

17. The method of claim 16 further comprising the step of providing a voltage controlled crystal stabilized oscillator which is used as the reference to said phase locked loop based local oscillator.

18. The method of claim 15, further comprising the step of providing a frequency discriminator with frequency discriminator output such that said frequency discriminator is used to determine said frequency error existing at any given time between said received signal and said receiver mid-channel frequency.

19. The method of claim 18 further comprising the step of providing a frequency discriminator conditioning means.

20. The method of claim 19 wherein said frequency discriminator conditioning means conditions said frequency discriminator output to provide different gains for said wide band frequency acquisition mode bandwidth and said narrow band demodulation mode bandwidth.

21. The method of claim 19 wherein said frequency discriminator conditioning means conditions said frequency discriminator output to provide different lowpass filter bandwidths for said wide band frequency acquisition mode bandwidth and said narrow band demodulation mode bandwidth.

22. The method of claim 15 further comprising the step of fine tuning said at least one local oscillator utilizing said automatic frequency control means after switching to said narrow band demodulation mode bandwidth.

23. The method of claim 15 further comprising the step of employing a known frequency step to fine tune said at least one local oscillator when switching from said wide band frequency acquisition mode bandwidth to said narrow band demodulation mode bandwidth.

24. A method for achieving efficient wireless communications in the presence of frequency errors in a radio frequency received signal, comprising the steps of:
   a) providing a receiving means which receives said received signal and which has at least one frequency adjustable local oscillator;
   b) selecting a receiver channel for said receiving means with a bandwidth greater than any frequency error in said received signal and having a receiver mid-channel frequency;
   c) adjusting automatically the frequency of said at least one frequency adjustable local oscillator based upon said frequency error such that the frequency difference between said receiver mid-channel frequency and said received signal is made negligible, thereby centering said received signal within said bandwidth;
   d) narrowing said bandwidth; and
   e) demodulating said received signal.

25. A method for achieving efficient wireless communications in the presence of frequency errors in a radio frequency received signal, comprising the steps of:
   a) providing a receiving means which receives said received signal and which has at least one adaptive digital signal processing based filter with a center frequency;
   b) selecting a receiver channel for said receiving means with a bandwidth greater than any frequency error in said received signal and having a receiver mid-channel frequency;
   c) determining the frequency error between said received signal and said receiver mid-channel frequency;
   d) adjusting automatically said center frequency of said at least one adaptive digital signal processing based filter based upon said frequency error such that the frequency difference between said center frequency and said received signal is made negligible, thereby centering said received signal within said bandwidth;
   e) narrowing said bandwidth; and
   f) demodulating said received signal.

* * * * *